United States Patent [19]

Sunder et al.

[11] Patent Number: 5,730,000
[45] Date of Patent: Mar. 24, 1998

[54] STRUCTURED PACKING ELEMENT AND A MASS AND HEAT TRANSFER PROCESS USING SUCH PACKING ELEMENT

[75] Inventors: Swaminathan Sunder, Allentown; Mark Robert Pillarella, Macungie; Frank Jude Riska, Palmerton, all of Pa.

[73] Assignee: Air Products and Chemicals, Inc., Allentown, Pa.

[21] Appl. No.: 647,498

[22] Filed: May 14, 1996

[51] Int. Cl.$^6$ .................................................. F25J 1/00
[52] U.S. Cl. ........................... 62/643; 62/906; 261/112.2
[58] Field of Search .................... 62/643, 906; 261/112.2

[56] References Cited

U.S. PATENT DOCUMENTS

| | | | |
|---|---|---|---|
| D. 254,506 | 3/1980 | Holmberg | 261/112.2 |
| 3,540,702 | 11/1970 | Uyama | 261/112.2 |
| 3,785,620 | 1/1974 | Huber | 261/112.2 |
| 3,963,810 | 6/1976 | Holmberg et al. | 261/112.2 |
| 4,186,159 | 1/1980 | Huber | 261/112 |
| 4,296,050 | 10/1981 | Meier | 261/112 |
| 4,455,339 | 6/1984 | Meier | 428/185 |
| 4,597,916 | 7/1986 | Chen | 261/94 |
| 4,604,247 | 8/1986 | Chen et al. | 261/94 |
| 4,950,430 | 8/1990 | Chen et al. | 261/112.2 |
| 4,981,621 | 1/1991 | Pluss | 261/112.2 |
| 5,132,056 | 7/1992 | Lockett et al. | 261/112.2 |
| 5,188,773 | 2/1993 | Chen et al. | 261/112.2 |
| 5,267,444 | 12/1993 | Lehman et al. | 261/112.2 |
| 5,419,136 | 5/1995 | McKeigue | 62/906 |
| 5,454,988 | 10/1995 | Maeda | 261/112.2 |
| 5,653,126 | 8/1997 | Harada et al. | 62/906 |

FOREIGN PATENT DOCUMENTS

| | | | |
|---|---|---|---|
| 0337150A1 | 10/1989 | European Pat. Off. | B01D 53/18 |
| 2810094 | 10/1978 | Germany | 261/112.2 |

Primary Examiner—Ronald C. Capossela
Attorney, Agent, or Firm—Willard Jones, II

[57] ABSTRACT

The present invention provides for a structured packing element, the element being corrugated with corrugations which form alternating peaks and troughs across the element, the corrugations having a longitudinal axis, the element having plural portions of first fluting at an angle between 0° and 180° to the longitudinal axis of the corrugations and plural portions of second fluting at an angle between 0° and 180° to the longitudinal axis of the corrugations, the fluting of the first portions being at an angle greater than zero to the fluting of the second portions, the respective first and second portions alternating both laterally and longitudinally of the element with respect to each other. The element preferably has a plurality of holes through the element. The foregoing structured packing is suited for use in processes requiring a contact device for accomplishing mass and/or heat transfer. The foregoing structured packing is particularly suited for a cryogenic air separation process comprising contacting vapor and liquid countercurrently in at least one distillation column containing at least one mass transfer zone wherein liquid-vapor contact is established by at least one structured packing element.

49 Claims, 1 Drawing Sheet

STRUCTURED PACKING ELEMENT AND A MASS AND HEAT TRANSFER PROCESS USING SUCH PACKING ELEMENT

FIELD OF THE INVENTION

The present invention relates to structured packing. The structured packing has particular application in exchange columns, especially in cryogenic air separation processes, though it may also be used in heat exchangers for example.

BACKGROUND OF THE INVENTION

In many processes, such as distillation or direct contact cooling, it is advantageous to use structured packing to promote heat and mass transfer between liquid and vapor streams which flow countercurrently to each other inside a column. Structured packing offers the benefit of high efficiency for heat and mass transfer combined with low pressure drop, when it is compared with dumped or random packing or with distillation trays. The most commonly used structured packing consists of corrugated sheets of metal or plastics foil or corrugated mesh cloths stacked vertically. These foils have various forms of apertures and/or surface roughening features aimed at improving the heat and mass transfer efficiency. While there are many types of structured packing described in the prior art, some of which are discussed below, they have evolved from a variety of applications and most have not been developed or optimized specifically for cryogenic separation processes, such as those used for separating the components of air.

U.S. Pat. No. 4,296,050 (Meier) describes the use of the combination of apertures with fluting or grooves in a structured packing. The fluting runs at an angle of 15°–90° to the vertical, in a direction generally opposed to that of the corrugations, which run at an angle of 15°–60° to the vertical. The wavelength of the fluting is in the range of 0.3 to 3.0 mm. The packing has widespread application in a variety of heat and mass transfer processes.

U.S. Pat. No. 4,186,159 (Huber) discloses a structured packing having alternating bands of fluted and unfluted (plain) regions which run horizontally across the packing when it is viewed in its intended orientation within the column. The extent of these bands is at least 5 mm. The open area is specified to be 5–20%.

U.S. Pat. No. 4,455,339 (Meier) describes the use of alternating corrugated and uncorrugated portions within each sheet of structured packing. The liquid acceleration, which would occur in the uncorrugated portions, is claimed to improve mass transfer performance.

U.S. Pat. No. 4,597,916 and U.S. Pat. No. 4,604,247 (Chen et al.) describe the use of crisscrossing patterns produced by expanded metal. They also show the use of perforations in combination with the crisscrossing patterns or horizontal slits. The use of perforated sheets alternating with corrugated sheets, both with a variety of holes and features, is also disclosed.

EP-A-337150 (Lockett et al.) describes the use of especially deep fluting which is said to improve the mass transfer performance due to increased liquid hold up and better spreading.

U.S. Pat. No. 4,981,621 (Pluss) describes the use of crisscrossing texture without holes, which improve the liquid spreading.

U.S. Pat. No. 5,132,056 (Lockett et al.) describes the use of edge modification to improve wetting, especially under turndown conditions.

U.S. Pat. No. 5,454,988 (Maeda) discloses the use of special fluting in a corrugated packing with no holes. The fluting generally runs in a horizontal direction and is more square-wave like than sine-wave like in cross-section. The fluting also has a meandering flow path for laterally spreading liquid.

It is also well-known in the prior art that mesh type packing helps spread liquid efficiently and gives good mass transfer performance, but mesh type of packing is much more expensive than most of the foil type packing described above.

An object of the present invention is to provide a specific structure that shows high performance characteristics for cryogenic applications such as those used in air separation.

A further object of the present invention is to generalize the specific structure such that it also shows a high performance in other, and preferably all, heat and mass transfer applications.

SUMMARY OF THE INVENTION

According to a first aspect of the present invention, there is provided a structured packing element, the element being corrugated with corrugations which form alternating peaks and troughs across the element, the corrugations having a longitudinal axis, the element having plural portions of first fluting at an angle between 0° and 180° to the longitudinal axis of the corrugations and plural portions of second fluting at an angle between 0° and 180° to the longitudinal axis of the corrugations, the fluting of the first portions being at an angle greater than zero to the fluting of the second portions, the respective first and second portions alternating both laterally and longitudinally of the element with respect to each other.

The element preferably has a plurality of holes through the element. The open area of the element may be in the range of 5 to 20%, and preferably in the range of 8% to 12%, of the total area of the element.

Said portions may be quadrangles. Said portions are preferably square.

The angle between the fluting of the first portions and the fluting of the second portions of the developed element as seen in elevation is preferably in the range of 30° to 150°, more preferably in the range of 80° to 100°, and most preferably substantially 90°.

According to a second aspect of the present invention, there is provided an exchange column for exchanging heat and/or mass between a first phase and a second phase, the exchanger comprising a plurality of packing elements, each element being corrugated with corrugations which form alternating peaks and troughs across the element, the corrugations having a longitudinal axis, each element being corrugated with corrugations which form alternating peaks and troughs across the element, the corrugations having a longitudinal axis, the element having plural portions of first fluting at an angle between 0° and 180° to the longitudinal axis of the corrugations and plural portions of second fluting at an angle between 0° and 180° to the longitudinal axis of the corrugations, the fluting of the first portions being at an angle greater than zero to the fluting of the second portions, the respective first and second portions alternating both laterally and longitudinally of the element with respect to each other.

The elements may be packed substantially vertically with the first fluting forming an angle of between 0° and 45°, preferably between 0° and 30° and more preferably between 0° and 10°, with the horizontal. The second fluting may form an angle substantially between 0° and 45°, preferably between 0° and 30° and more preferably between 0° and 10°, with the vertical. Most preferably, the elements are packed substantially vertically, the first fluting being substantially horizontal and the second fluting being substantially vertical.

The longitudinal axis of the corrugations may be at an angle substantially between 20° and 70°, preferably between 30° and 60° and most preferably at an angle of substantially 45° with the horizontal.

Each element in the exchanger may have a plurality of holes through the element.

In another aspect, the invention also provides a process for cryogenic air separation comprising contacting vapor and liquid countercurrently in at least one distillation column containing at least one mass transfer zone wherein liquid-vapor contact is established by at least one structured packing element, the element being corrugated with corrugations which form alternating peaks and troughs across the element, the corrugations having a longitudinal axis, the element having plural portions of first fluting at an angle between 0° and 180° to the longitudinal axis of the corrugations and plural portions of second fluting at an angle between 0° and 180° to the longitudinal axis of the corrugations, the fluting of the first portions being at an angle greater than zero to the fluting of the second portions, the respective first and second portions alternating both laterally and longitudinally of the element with respect to each other.

The present invention provides a corrugated structured packing element that shows high performance characteristics for heat and mass transfer applications.

In use, in a preferred embodiment, the adjacent sheets of the packing elements are stacked vertically, the corrugations running in a crisscrossing and opposing fashion; the sheets of the packing elements build up a layer which covers a cylindrical section of a packed tower, which itself is configured as a tall vertical cylinder; the many layers that constitute the packed section of a given column or tower are rotated relative to one another about the column axis which is generally vertical; and, vapor and liquid are fed via distributors and preferably flow in roughly countercurrent directions.

BRIEF DESCRIPTION OF THE DRAWINGS

Embodiments of the invention will now be described by way of example with reference to the accompanying drawings, in which.

DETAILED DESCRIPTION OF THE INVENTION

Figure 1:
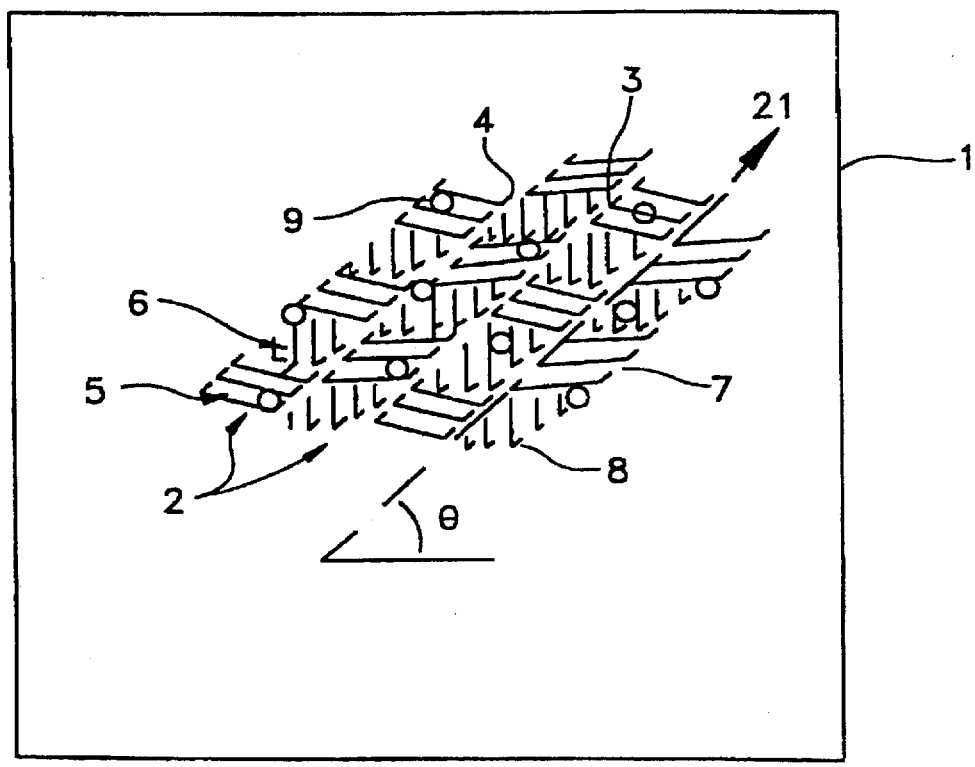
FIG. 1 is a perspective view of a packing element, showing the surface texture of a portion of a first example of the element; and, FIG. 2 is a detailed view showing the surface texture of a second example of a packing element.

In the drawings, generally only a representative portion of a packing element 1 is shown.

Figure 2:
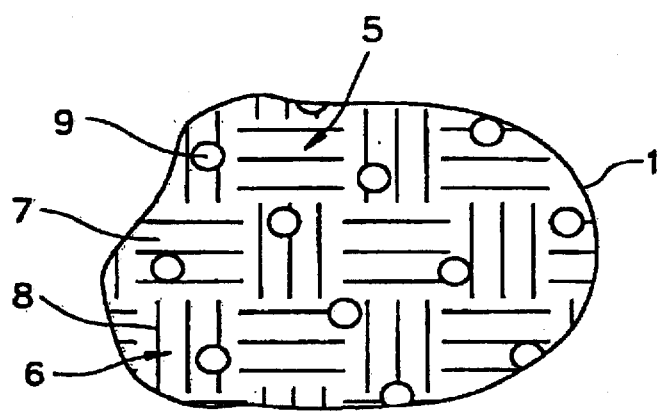

The element 1 is a sheet-like structure and is provided with regularly spaced, relatively deep, corrugations 2 which form peaks 3 and troughs 4 in the element 1. It will be appreciated that a peak viewed from one side of the element 1 will be a trough when viewed from the other side of the element 1 and vice versa. In use in a cryogenic air separation tower for example, the element 1 is packed vertically as shown in FIGS. 1 and 2 and as will be discussed further below. The corrugations 2 are substantially parallel and have a longitudinal axis 21 which is at an angle 8 to the horizontal. The corrugations 2 are generally sinusoidal. However, different profiles for the corrugations 2 are possible, such as, for example, pleated, square wave, triangular wave, and sawtooth wave, or the corrugations may be composed of elliptical or parabolic profiled segments, for example.

The element 1 is provided with a particular surface texture which improves the performance of the element compared to the known packing elements. In particular, the element 1 has alternating portions of what shall be termed herein "fluting", the fluting providing a bidirectional surface texture in which there are portions of generally horizontal fluting 5 and portions of generally vertical fluting 6 in the vertically packed corrugated element 1. The fluting 5,6 is formed by relatively fine grooves 7,8 or corrugation or striation of the surface of the element 1 in a manner which in itself is known, e.g. by stamping or rolling with a suitable die.

As will be seen from the drawings, the portions 5,6 of horizontal and vertical fluting alternate both laterally and longitudinally of the sheet element 1 and the respective portions are preferably square. Thus, each square portion of horizontal fluting 5 is surrounded on each side by square portions of vertical fluting 6 and vice versa. This gives the surface of the element 1 an appearance which is similar to a basket weave. It will be appreciated that the portions of horizontal and vertical fluting 5,6 need not be square and may be rectangular instead, for example.

The element 1 is provided with a plurality of through holes 9 in an array across the element 1. The through holes 9 may be in a regular array or may be distributed randomly across the element 1.

Below is discussed some possible ranges of dimensions for the element 1 and its component features.

The surface area density of the element 1 is preferably in the range of 250–1500 $m^2/m^3$ with a most preferred range of 500–1000 $m^2/m^3$. This can be realized through many different combinations of P, H and r, P being the "wavelength" or peak-to-peak separation of the corrugations 2, H being the amplitude or peak-to-peak height of the peaks 3, and r being the radius of curvature of a peak 3.

The corrugations 2 run in a generally sinusoidal wave pattern. The corrugations can be manufactured with curved peaks 3 and straight portions in between the peaks 3. The ratio of the corrugation wavelength to the corrugation radius of curvature is in the range of 5–30, with a preferred range of 10–25.

The thickness of the sheet is preferably in the range of 0.05–1.0 mm with a most preferred range of 0.10–0.25 mm.

The open area of the element 1 is preferably in the range of 5–20%, with a most preferred range of 8–12%, of the total area of the element 1.

The holes 9 in the packing are circles with a diameter in the range of 1–5 mm, with a preferred range of 2–4 mm. Alternatively, the holes in the packing are not circular, but their equivalent diameters—calculated as four times the area divided by the perimeter—are in the range mentioned above for circular holes.

The width of the portions 5,6 of horizontal and vertical fine grooves 7,8 are in the range of 2 to 20 mm each, with a preferred range of 5–10 mm. The portions 5,6 need not be square and may be rectangular.

The wavelength of the fine grooves 7,8 of the surface texture forming the portions of horizontal and vertical fluting 5,6 is in the range of 0.5–5 mm with a preferred range of 1–3 mm. The pitches or wavelength in the horizontal and vertical portions 5,6 can be different.

The peak-to-peak height of the surface texture is in the range of 0.25–1.20 mm with a preferred range of 0.25–0.50 mm. The peak-to-peak height can be different in the horizontal and vertical portions 5,6.

The corrugation angle with the horizontal (θ in FIG. 1) is in the range of 20°–70° with a preferred range of 30°–60° and is most preferably 45°.

The included surface texture angle of the developed element 1 is in the range of 30°–150° with a preferred range of 80°–100°, and most preferably 90°.

The three features of the corrugations, holes and surface texture are arranged in such a manner that repeating patterns do not occur. Successive corrugations look different and the combinations are random. This is preferred. Alternatively, the three features of the corrugations, holes and surface texture are arranged in such a manner that repeating patterns do occur. Successive corrugations look similar, with the patterns repeating after one or more corrugations.

The material of the packing element 1 is stainless steel, monel, brass, aluminum, copper or their alloys or plastics, or any other suitable material.

The corrugations 2 and surface texture or fluting 5,6,7,8 are generally manufactured by a process such as rolling or pressing which determines the exact nature of the waves of each feature produced. They are generally sinusoidal in nature, but they need not be exactly sinusoidal.

Alternatively, the surface texture may be produced by other well-known manufacturing techniques such as milling, cutting or grinding.

The structured packing element 1 of the present invention can be used in a mass and/or heat transfer process such as distillation or direct contact cooling. A section of a column or tower is packed with the segments of the element, stacked vertically and with means to distribute liquid uniformly from above and vapor or gas uniformly from below. The liquid and vapor or gas flow under the influence of gravity in roughly countercurrent directions to each other. In many cases, it is advantageous to use a column with its axis along the vertical direction, but the present packing element 1 may also be used where the column axis is not vertical, but is instead in a horizontal or some other intermediate orientation. However, the relationship between the packing layers, the liquid and vapor flow, and the distributors would have to be maintained as before.

Specifically, it is advantageous to use the present packing element 1 for a gas-liquid or vapor-liquid contacting device, for which the ability to wet the packing and to spread and remix the liquid are critical.

More specifically, it is advantageous to use the present packing element 1 for separation processes that employ cryogenic distillation. Examples of cryogenic distillation include separation of the components of air by using one or more contacting devices such as columns. The current packing element 1 may be used in one or more sections of these contacting devices.

Also, it is advantageous to use the present packing element 1 for direct contact cooling applications. An example of this process is a tower that cools hot or warm air with cooler water, by direct contact between the phases wherein both heat and mass transfer take place. The element 1, though without through holes 9, may also be used in a heat exchanger in which the hot and cold phases exchange heat without coming into contact with each other.

The present invention also includes a process for exchanging mass and/or heat between two liquids, comprising contacting said liquids in at least one exchange column wherein liquid-liquid contact is established by at least one structured packing element, the element being corrugated with corrugations which form alternating peaks and troughs across the element, the corrugations having a longitudinal axis, the element having plural portions of first fluting at an angle between 0° and 180° to the longitudinal axis of the corrugations and plural portions of second fluting at an angle between 0° and 180° to the longitudinal axis of the corrugations, the fluting of the first portions being at an angle greater than zero to the fluting of the second portions, the respective first and second portions alternating both laterally and longitudinally of the element with respect to each other, wherein one of said liquids preferentially wets said packing element. Said liquids may flow co-currently or counter-currently in the exchange column.

The present invention has been described with particular reference to the examples illustrated. However, it will be appreciated that variations and modifications may be made to the example described within the scope of the present invention.

We claim:

1. A structured packing element having corrugations which form alternating peaks and troughs across the element, the corrugations having a longitudinal axis, the element having first portions of first fluting at an angle between 0° and 180° to the longitudinal axis and second portions of second fluting, the first fluting being at an angle greater than zero to the second fluting, the first portions and the second portions alternating both laterally and longitudinally of the element with respect to each other on the corrugations.

2. The element of claim 1, further comprising a plurality of holes through the element.

3. The element of claim 2, wherein the open area of the element is in the range of 5% to 20% of the total area of the element.

4. The element of claim 2, wherein the open area of the element is in the range of 8% to 12% of the total area of the element.

5. The element of claim 1, wherein said first and second portions are quadrangles.

6. The element of claim 1, wherein said first and second portions are substantially square.

7. The element of claim 1, wherein the angle between the first fluting and the second fluting is in the range of 30° to 150°.

8. The element of claim 1, wherein the angle between the first fluting and the second fluting is in the range of 80° to 100°.

9. The element of claim 1, wherein the angle between the first fluting and the second fluting is substantially 90°.

10. An exchange column for exchanging heat and/or mass between a first phase and a second phase, the exchange column having at least one structured packing element, each element having corrugations which form alternating peaks and troughs across the element, the corrugations having a longitudinal axis, each element having first portions of first fluting at an angle between 0° and 180° to the longitudinal axis and second portions of second fluting, the first fluting being at an angle greater than zero to the second fluting, the first portions and the second portions alternating both laterally and longitudinally of the element with respect to each other on the corrugations.

11. The column of claim 10, wherein the elements are packed substantially vertically, the first fluting forming an angle of between 0° and 45° with the horizontal.

12. The column of claim 10, wherein the elements are packed substantially vertically, the first fluting forming an angle of between 0° and 30° with the horizontal.

13. The column of claim 10, wherein the elements are packed substantially vertically, the first fluting forming an angle of between 0° and 10° with the horizontal.

14. The column of claim 10, wherein the elements are packed substantially vertically, the first fluting being substantially horizontal.

15. The column of claim 10, wherein the elements are packed substantially vertically, the second fluting forming an angle substantially between 0° and 45° with the vertical.

16. The column of claim 10, wherein the elements are packed substantially vertically, the second fluting forming an angle substantially between 0° and 30° with the vertical.

17. The column of claim 10, wherein the elements are packed substantially vertically, the second fluting forming an angle substantially between 0° and 10° with the vertical.

18. The column of claim 10, wherein the elements are packed substantially vertically, the second fluting being substantially vertical.

19. The column of claim 10, wherein the packing elements are packed substantially vertically, the longitudinal axis of the corrugations being at an angle substantially between 20° and 70° with the horizontal.

20. The column of claim 10, wherein the packing elements are packed substantially vertically, the longitudinal axis of the corrugations being at an angle between 30° and 60° with the horizontal.

21. The column of claim 10, wherein the packing elements are packed substantially vertically, the longitudinal axis of the corrugations being at an angle of substantially 45° with the horizontal.

22. The column of claim 10, wherein the angle between the first fluting and the second fluting of each of the elements is in the range of 30° to 150°.

23. The column of claim 10, wherein the angle between the first fluting and the second fluting of each of the elements is in the range of 80° to 100°.

24. The column of claim 10, wherein the angle between the first fluting and the second fluting of each of the elements is substantially 90°.

25. The column of claim 10, wherein each element has a plurality of holes through the element.

26. A process for cryogenic air separation comprising contacting vapor and liquid countercurrently in at least one distillation column containing at least one mass transfer zone wherein liquid-vapor contact is established by at least one structured packing element, the element having corrugations which form alternating peaks and troughs across the element, the corrugations having a longitudinal axis, the element having first portions of first fluting at an angle between 0° and 180° to the longitudinal axis and second portions of second fluting, the first fluting being at an angle greater than zero to the second fluting, the first portions and the second portions alternating both laterally and longitudinally of the element with respect to each other on the corrugations.

27. The process of claim 26, further comprising a plurality of holes through the element.

28. A process for exchanging mass and/or heat between two liquids, comprising contacting said liquids in at least one exchange column wherein liquid-liquid contact is established by at least one structured packing element as in any one of claims 1 through 9.

29. The process of claim 28, further comprising a plurality of holes through the element.

30. A process according to claim 29, wherein said liquids flow co-currently in the exchange column.

31. A process according to claim 29, wherein said liquids flow counter-currently in the exchange column.

32. A structured packing element comprising a corrugated sheet having fine grooves arranged on the corrugated sheet in first portions and second portions, wherein the fine grooves in the first portions are generally horizontal and the fine grooves in the second portions are generally vertical, and the first portions alternate both laterally and longitudinally with respect to the second portions.

33. A structured packing element as in claim 32 further including a plurality of apertures in the corrugated sheet.

34. A structured packing element as in claim 32 wherein the first and second portions are substantially square.

35. A structured packing element as in claim 33 wherein the apertures create open area in the range of 5% to 20% of the total surface area of the element.

36. A structured packing element as in claim 32 wherein the first and second portions are quadrangles.

37. An exchange column for exchanging heat and/or mass between a first phase and a second phase, the exchange column having at least one structured packing element as in claim 32.

38. An exchange column for exchanging heat and/or mass between a first phase and a second phase, the exchange column having a structured packing which includes packing elements as in any one of claims 34–35.

39. An exchange column as in claim 37, wherein the structured packing elements are packed substantially vertically.

40. An exchange column as in claim 37, wherein the structured packing elements are packed substantially vertically and the corrugations of each structured packing element have a longitudinal axis at an angle substantially between 20° and 70° with the horizontal.

41. An exchange column as in claim 37, wherein the structured packing elements are packed substantially vertically and the corrugations of each corrugated sheet of each structured packing element have a longitudinal axis at an angle substantially 45° with the horizontal.

42. A process for cryogenic air separation comprising contacting vapor and liquid counter-currently in at least one distillation column containing at least one mass transfer zone wherein liquid-vapor contact is established by at least one structured packing element as in claim 32.

43. A process for cryogenic air separation comprising contacting vapor and liquid counter-currently in at least one distillation column containing at least one mass transfer zone wherein liquid-vapor contact is established by at least one structured packing element as in any one of claims 34-33.

44. A process for exchanging mass and/or heat between two liquids, comprising contacting said liquids in at least one exchange column wherein liquid-liquid contact is established by at least one structured packing element as in claim 32.

45. A process for exchanging mass and/or heat between two liquids, comprising contacting said liquids in at least one exchange column wherein liquid-liquid contact is established by at least one structured packing element as in any one of claims 34-33.

46. A process as in claim 45, wherein said liquids flow co-currently in the exchange column.

47. A process as in claim 45, wherein said liquids flow counter-currently in the exchange column.

48. A method for manufacturing a structured packing element, comprising the steps of:

providing a sheet;

forming a bidirectional surface texture in the form of fine grooves arranged on the sheet in first portions and second portions, wherein the fine grooves in the first portions are generally horizontal and the fine grooves in the second portions are generally vertical, and the first portions alternate both laterally and longitudinally with respect to the second portions; and forming corrugations in the sheet, said corrugations being generally regularly spaced and in substantially parallel relation.

49. A method for manufacturing a structured packing element as in claim 48 further comprising the step of forming a plurality of apertures in the sheet.

* * * * *